April 28, 1970  
W. F. TAYLOR  
3,508,873  
HYDROGEN PRODUCED IN AQUEOUS HYDROCARBON  
EMULSION MULTIBED REACTOR  
Filed Feb. 3, 1967
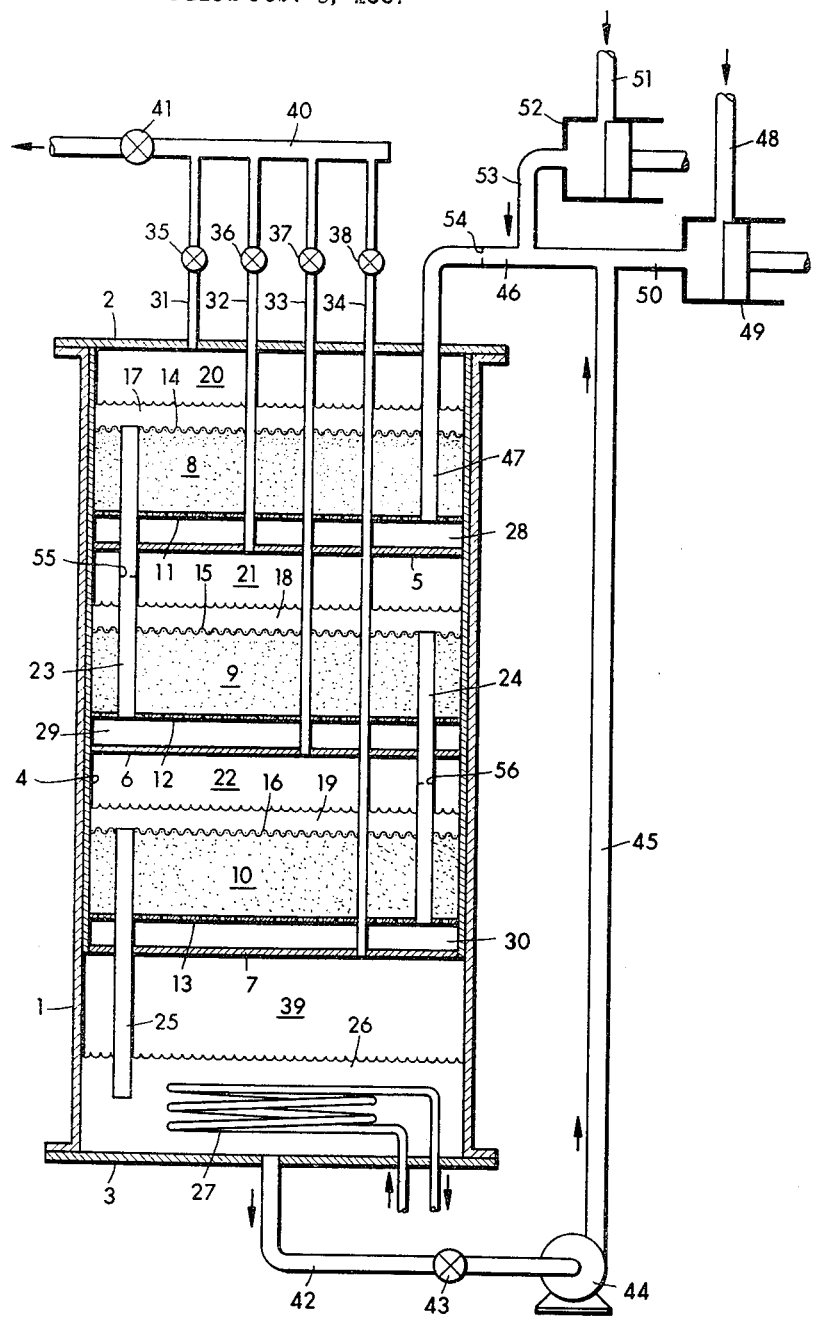
W. F. TAYLOR    INVENTOR
BY  *Henry Berk*
PATENT ATTORNEY

3,508,873
HYDROGEN PRODUCED IN AQUEOUS HYDROCARBON EMULSION MULTIBED REACTOR

William F. Taylor, Scotch Plains, N.J., assignor to Esso Research and Engineering Company, a corporation of Delaware
Filed Feb. 3, 1967, Ser. No. 613,936
Int. Cl. B01j 9/04; C01b 2/16
U.S. Cl. 23—211                                        8 Claims

ABSTRACT OF THE DISCLOSURE

Means and method for treating liquid mixtures successively distributed up through solids beds under controlled varied pressures in series and for removal of gaseous products as they are formed in each of the beds.

More particularly, it relates to a high pressure apparatus and operation for producing hydrogen by reaction of liquid hydrocarbon dispersed in water as an emulsion or liquid reaction mixture brought into contact with catalyst solids in a number of vertically spaced beds with means for distributing such liquid emulsion up through each bed, for passing such emulsion of unconverted liquid reactants serially through the beds and for removing gas product formed in the beds in a manner that avoids further contact of gas products with the catalyst solids.

CROSS REFERENCE

This application is related to U.S. patent application Ser. No. 385,931, filed by W. F. Taylor on July 29, 1964, abandoned July 5, 1967 wherein is disclosed a process for producing hydrogen by passing an aqueous emulsion of liquid hydrocarbon into contact with an active nickel-containing catalyst in one or more beds for a partial conversion to gases rich in hydrogen when contact of the gases with the catalyst is brief.

BACKGROUND

The apparatus of this invention is in the category of continuous tower reactors or autoclaves which are generally vertical cylindrical vessels equipped with agitating and heat exchange means. Autoclaves are strongly constructed and have closures and fittings to withstand high pressures. Each kind of autoclave has a special design for particular need.

In the present instance, a tower or autoclave is designed for passing an emulsion of liquid hydrocarbon in water through a series of beds of solid catalyst, for separation of gas products from the emulsion flowing up through each bed. The catalyst beds may be fixed in a separate thin walled container inside a pressure-resisting shell. The assembly of internal parts, including catalyst chambers, gas removal pipes, emulsion passages, emulsifying devices, and auxiliary equipment, e.g., thermocouple wells and other fittings, may be made removable as a unit with the head or bottom of the reactor removed.

The process of producing hydrogen in the reactor is related to steam reforming but is distinguished therefrom in being carried out at low temperatures and high pressures with high thermal efficiency. Heat losses from vaporizing water and liquid hydrocarbon reactant are minimized in the liquid phase reaction to generate hydrogen. Energy for pumping is also minimized, since the unconverted reactant mixture is a liquid, not a gas. The problem of controlling contact of the liquid reactants and of gas product with catalyst while obtaining suitable flow of emulsion from one bed to another is solved in the multibed continuous reactor.

SUMMARY

Generation of hydrogen by reaction of liquid hydrocarbons with water at low temperatures and high pressures is useful in making $H_2$-containing gas which can be economically purified and then be employed for various purposes, e.g., in fuel cells, and hydrogenation reactions. A hydrogen generating process of this type is feasible with presently known nickel catalysts of high activity.

The highly active reforming catalysts are represented by catalysts containing 40 to 60% Ni interspersed with alumina and promoted by various oxides of metals such as Ba, La, Ce Sr, K, Cs, or the like. These catalysts are formed by coprecipitation of Ni and Al hydroxides, carbonates and bicarbonates from aqueous nitrate salts of Ni and Al using $NH_3$ or $NH_4HCO_3$ as precipitant, adding similar decomposable salts of the promoters to the coprecipitate, then drying the resulting solids, calcining them in air at below 950° F. and finally activating by $H_2$ gas which can be done when the catalyst is in the reactor by providing means for flowing reducing gas through the catalyst beds at 600° to 950° F. The high nickel content catalyst has a high nickel surface area in the range of 20 to 30 m.²/g.

Various naphtha hydrocarbons, preferably normally liquid paraffinic hydrocarbons having 5 to 20 carbon atoms, may be present in the liquid hydrocarbon reactant feed which is emulsified in water or dispersed as small droplets in an excess of water to be reacted in the presence of an active catalyst to produce hydrogen. Using decane as an example of the hydrocarbon to be reacted in liquid phase with water, the following theoretical equation illustrates the reaction:

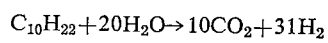
$$C_{10}H_{22} + 20H_2O \rightarrow 10CO_2 + 31H_2$$

Although a number of reactions occur simultaneously, including the water gas shift reaction of CO with $H_2O$ to form $CO_2$ and $H_2$ and the methanation reaction of CO with $H_2$ to form $CH_4$ and $H_2O$, a high hydrogen content gas is obtained when the hydrocarbon conversion level is low, e.g., below 25% at temperatures of 110° to 550° F. and the hydrogen-rich gas product is removed rapidly and prevented from recontacting the catalyst to minimize the formation of methane. Thus, at 500° F. with 1% conversion of decane emulsified in an emulsion containing above 4 moles $H_2O$ per mole of decane and under pressures sufficiently high to lower the content of the $H_2O$ and hydrocarbon reactant in the vapor phase, a gas product is obtained containing mainly $H_2$ with lower amounts of $CO_2$ and $CH_4$ and small amounts of heavier gaseous hydrocarbons and of CO.

THE DRAWING

In the drawing is shown schematically a reaction tower or autoclave in elevational cross-sectional view.

The tower has an outer cylindrical pressure shell 1, a headplate closure 2, and a bottom plate closure 3.

In the tower is a suspended or supported thin walled container 4 partitioned by plates 5, 6, and 7 into a number of treating or reaction zones, each occupied by a bed of solids 8, 9, and 10 in descending elevational order.

Each bed of solids, such as catalyst pellets or granules, is held on a liquid-permeable supporting means, 11, 12, and 13, as in the form of a sieve tray or perforated plate through which a liquid mixture or emulsion flows to be distributed up through each bed. A screen or perforated disc permeable to fluids, 14, 15, and 16, may be placed on or above each bed to hold down solids while treated liquid mixture or unconverted liquid emulsion and gas bubbles pass upwardly therethrough.

The beds of solids, 8, 9, and 10, are vertically spaced in the tower and in each chamber so that treated or unconverted liquid mixtures form overflow liquid layers, 17, 18, and 19, above each bed and a gas collecting space, 20, 21, and 22, is provided above each overflow liquid layer in each chamber.

Draw-off pipes or downspouts, 23, 24, and 25, draw off liquid from each of said overflow liquid layers, 17, 18, and 19. The downspouts, 23 and 24, conduct the overflow liquid to lower chambers for distribution up into a lower bed. Downspouts, 23 and 24, may contain an emulsifying device, 55 and 56, which disperses the hydrocarbon in the overflow liquid. Downspout 25 conducts the overflow liquid 19 from the bottom bed to the sump or liquid collection zone 26, wherein a heating tube 27 may be placed to aid disengagement of gas from the liquid and to supply heat for reaction.

The plates, 5, 6, and 7, receive liquid mixture on their top surfaces for flowing the liquids as a rising stream up to the liquid permeable supporting means, 11, 12, and 13, for distribution in the beds above from each subadjoining space, 28, 29, and 30. Plates 5, 6, and 7 act also as partitions which block flow of gas from the gas collection spaces below to beds of solids above. Plates 5, 6, and 7 hold the downspouts, 23, 24, and 25, in place for removal of overflow liquid. These downspouts may be provided with check valves to prevent backflow.

Tubes 31, 32, 33, and 34 are gas outlet means, each with a flow and pressure control valve, 35, 36, 37, and 38, for removing gas from each gas collecting space, 20, 21, and 22, above each solids bed and from the gas collecting space, 39, above the liquid mixture, 26, in the sump. These gas outlet means thus can be used for controlling the pressure in each gas collecting space, and they may be connected outside the tower to a main, 40, which leads the gas to where it is further stored, processed, or used.

In further processing the gas, it may be cooled to condense out liquids, be further dried, or purified, e.g., by removal of gaseous hydrocarbons and carbon oxides. Conventional purification treatments for purification of high pressure hydrogen, e.g., absorption or adsorption, or palladium diffusions may be used.

The internal assembly of the liquid-permeable supporting means, 11, 12, and 13, holding the beds of solids, 8, 9, and 10, the partitioning means, 5, 6, and 7, which prevent flow of gas from below to beds above, the downspout means, 23, 24, and 25, for passing liquid from each chamber to a lower part of the tower, and any other connected parts, e.g., container 4, gas outlet tubes 32, 33, and 34, etc., can be made an integral unit removable vertically from either the top or bottom end of the tower when it is opened. Removal of the assembly in this manner is convenient for renewing catalyst solids and for repairs.

Although the apparatus shown is adapted for high-pressure operation without side-stream connections for strengthened tower construction and unitized internal assembly, modifications may be made in the use of side-stream inlets for injecting liquids passed up through each bed of solids, side-stream pipes for removing liquids from above each bed and side-stream gas outlet tubes for removing gas from above each bed in performing the described operations under lower pressures.

The control valves, 35, 36, 37, and 38, may be set to control gas pressures in the gas collecting spaces, 20, 21, 22, and 39. The gas outlet tubes, 31, 32, 33, and 34, may have similar or different internal diameters or flow control with the setting of their valves. Thus, gas pressures can be controlled separately in each gas collecting space inside the tower, so that gas above a more elevated bed has a higher pressure than gas above the next lower bed, and gas above the lowest bed has a higher pressure than gas above the sump liquid. The adjusted gas pressure added to the hydrostatic pressure of liquid mixture in the downspouts permits adjustment of liquid overflow on each bed and general liquid downflow through the tower, taking into consideration the pressure drop through each bed.

The tubes, 31, 32, 33, and 34, may be of similar or different diameters for flow control in conjunction with the setting of valves 35, 36, 37, and 38. Thereby, gas pressures can be controlled separately in each chamber. With a higher gas pressure above an upper bed, 9, than above a lower, 10, pressure is added to the hydrostatic pressure of liquid emulsion made to flow from above bed 9 into bed 10 and similarly lower pressures are used above lower beds and above the sump liquid, 26.

Unconverted liquid emulsion is drawn from sump liquid 26 by pipe 42 through flow control valve 43 to pump 44 for recirculation in pipe 45 to the liquid bed inlet tube, 46, through an emulsifying device, 54, and then through the pipe, 47, in head plate 2. Make-up water is injected from pipe 51 by pump 52 and pipe 53 into feed line 46. Make-up hydrocarbon liquid is injected from pipe 48 by pump 49 and pipe 50 into feed line 46. The make-up liquid feed joins recirculating emulsion feed from line 45, and passes through emulsifying device 54. The emulsifying devices, 54, 55, and 56, may be high shear mixing devices for producing small hydrocarbon droplets in a continuous water phase. Such emulsifying devices may be of a perforated plate type where the hydrocarbon and water are forced under pressure to flow through narrow restrictions at high velocity and shear, such as is done in a homogenizer.

Valve 41 in the gas conduit, 40, may be a pressure regulating valve to maintain desired pressures on both sides of the valve in the conduit, 40.

In the apparatus, various engineering devices for controlling fluid flow, temperature, pressure, heat exchange, recycling of liquids, and dispersion of liquids may be used. Other added means not shown which may be used are means for removing water, and for absorbing or adsorbing hydrocarbons and $CO_2$ components in order to concentrate or purify the hydrogen gas produced.

The preferred operation is shown in the drawing to obtain good mixing or emulsification of liquid reactants, good contact of the emulsion or liquid mixture with solid catalyst particles present in each of any number of beds, short time of contract of gas product with the catalyst, and pressure control in each chamber for controlled flow of liquids up through each bed and continuous flow through the chambers in descending order.

PREFERRED EMBODIMENT

In a continuous multibed reactor devised as shown in the drawing, a controlled flow of oil-in-water emulsion is obtained up through each bed of solid catalyst in succession, gas product formed in each bed is removed to outside the reactor, and unreacted emulsion is recycled after disengaging gas from the emulsion and replenishing liquid reactants.

In test operations, a reactor was charged with the highly active catalysts $Ni-Al_2O_3-Ba$ and $Ni-Al_2O_3-La$ containing 40 to 45 wt. percent Ni of the type described which were reduced in a stream of $H_2$ at 900° F. The catalyst in the form of particles or pellets, 1 to 10 mm. size, was arranged in shallow beds having a vapor space above each bed for gas removal. An emulsion of 1 mole decane in 9 moles $H_2O$ was prepared mechanically by a jet mixer and was introduced under pressure at temperatures starting at 150° F. The unreacted emulsion passed through a first bed and through subsequent beds in sequence. Gas generated in each bed was removed at a steady rate as the rate of emulsion flow became steady. The effluent gas product removed from the beds was passed through a condensate separation chamber and gas meter. Care was taken to prevent further contact with the gas product evolved in each bed.

Samples of gas product formed and separated as described were taken in stainless steel bombs for analysis by a mass spectrometer. On a dry basis, the gas product was analyzed to contain 58 to 70% $H_2$, 29 to 27% $CO_2$ and gaseous hydrocarbon as the remainder.

The tests showed that the system is most efficient in continuous operation when fed on a demand basis to maintain a liquid level approximately equal to the depth of the catalyst beds. The catalyst bed depth depends on the emulsion flow rate and temperature for a desired amount of conversion. Low bed depths of 1 to 30 cms. have been used.

Using catalysts having particle sizes of 0.1 mm. to 1.5 cm., an oil-in-water emulsion of milky appearance containing from 1/2 to 200/1 $H_2O$/hydrocarbon weight ratio is passed through the beds at reaction temperatures in the range of 110° to 550° F. and pressures of 100 to 5000 p.s.i.g.

The rate of gas production depends on factors of flow rate, catalyst activity, and temperature. A minimum gas rate of 0.5 liter per sq. cm. cross section of each bed per hour is obtained.

The apparatus and method of operation described can be used as such or with modifications for various reactions in which a gaseous product is to be removed for decreasing reversible or additional reactions, e.g., hydrolysis and dehydrogenation reactions.

I claim:
1. An apparatus for treating a liquid in a succession of beds of catalytic solids to form in said beds a gaseous product having a short time of contact with said solids, which comprises:
    (a) A treating tower;
    (b) A plurality of impermeable plates dividing the tower into vertically spaced reaction zones, including a top zone and a bottom zone;
    (c) Liquid-permeable solids-supporting means within each reaction zone vertically spaced above each said plate and defining therewith a liquid distributing space;
    (d) Downspout means arranged to flow liquid from each of said reaction zones other than said bottom zone into the liquid distributing space of the next lower reaction zone, the upper intake end of said downspout means being positioned intermediate the top of said reaction zone and said liquid-permeable supporting means, thereby providing above said inlet a gas collecting space;
    (e) Means for removing liquid from said bottom reaction zone, the inlet of said last-named means being positioned intermediate the top of said zone and said liquid-permeable solids-supporting means whereby there is provided above said last-named inlet a gas collecting space;
    (f) Separate gas outlet means connecting each said gas collecting space with a conduit outside the said tower; and
    (g) Means for introducing liquid into the liquid distributing space of said top zone;
    whereby liquid to be treated can be introduced into the liquid distributing space of said top zone to flow up through a bed of catalytic solids positioned therein and overflow from said bed through a downspout into the liquid distributing space of the next lower zone wherein it will pass upflow through another bed of catalytic solids, and whereby gas generated within each bed of catalytic solids will separate from overflowing liquid in the gas collecting space above downspout and can be removed from said gas collecting space out of further contact with catalytic solids.

2. An apparatus as defined by claim 1 which includes valve means in said gas outlet means whereby gas pressure within a selected gas collecting space can be controlled.

3. An apparatus as defined by claim 1 wherein said impermeable plates, said liquid-permeable solids-supporting means, said downspout means and gas outlet means form an integral assembly removable from said tower.

4. An apparatus as defined by claim 1 which includes a bottom sump section for receiving liquid removed from said bottom reaction zone and means for heating liquid in said sump section to disengage gas therefrom.

5. An apparatus as defined by claim 1 including pump means for recycling liquid removed from said bottom reaction zone to an upper reaction zone.

6. In a process wherein a liquid is contacted in each of a succession of beds of catalytic solids under conditions wherein a gaseous product is produced in each bed, and separated liquid is then conducted by gravity through a lower succeeding bed in the series, the improvement which comprises positioning each bed in an isolated reacting zone, passing the said liquid upwardly through each of said beds, spreading gaseous product from liquid above each of said beds in a gas collection space and separately removing said gaseous product from said zone out of contact with other beds in said series, whereby further contact of gaseous product with catalytic solids is avoided.

7. Process improvement as defined by claim 6 wherein the gas pressure within each gas collection space is individually adjusted so as to control gravity flow of liquid from the reaction zone containing that gas collection space into a succeeding reaction zone.

8. Process improvement as defined by claim 6 wherein said catalytic solids comprise a highly active nickel-containing catalyst, said liquid comprises an emulsion of liquid paraffinic hydrocarbon in water and said gaseous product comprises hydrogen.

References Cited
UNITED STATES PATENTS

| | | | |
|---|---|---|---|
| 2,245,145 | 6/1941 | Hall et al. | 23—288 |
| 2,257,178 | 9/1941 | Martin et al. | 23—288 |
| 2,327,045 | 8/1943 | Huff | 23—288 |
| 2,338,345 | 1/1944 | Mather | 23—288 |
| 2,346,501 | 4/1944 | Nagle et al. | 23—288 |
| 3,003,640 | 10/1961 | Pearce | 23—288 X |
| 3,054,776 | 9/1962 | Higgins | 23—285 X |
| 3,425,810 | 2/1969 | Scott | 23—288 X |

JOSEPH SCOVRONEK, Primary Examiner

U.S. Cl. X.R.

23—1, 288, 289; 48—214; 252—373

PO-1050
(5/69)

UNITED STATES PATENT OFFICE
CERTIFICATE OF CORRECTION

Patent No. 3,508,873          Dated April 28, 1970

Inventor(s)     William F. Taylor

It is certified that error appears in the above-identified patent and that said Letters Patent are hereby corrected as shown below:

In column 4, line 41, "contract" should read -- contact --.

In column 6, line 3, insert the word -- a -- after "above"; and in line 28, "spreading" should read -- separating --.

SIGNED AND SEALED
MAR 2 1971

(SEAL)
Attest:

Edward M. Fletcher, Jr.
Attesting Officer

WILLIAM E. SCHUYLER, JR.
Commissioner of Patents